United States Patent [19]

Lambooy

[11] Patent Number: 4,875,253
[45] Date of Patent: Oct. 24, 1989

[54] PROCESS FOR STUNNING LIVESTOCK

[75] Inventor: Elbert Lambooy, Veenendaal, Netherlands

[73] Assignee: Stichting Instituut Voor Veeteeltkundig Onderzoek "Schoonoord", Am Zeist, Netherlands

[21] Appl. No.: 240,755

[22] Filed: Sep. 2, 1988

[30] Foreign Application Priority Data

Sep. 7, 1987 [NL] Netherlands ............... 8702114

[51] Int. Cl.⁴ ............................................. A22B 3/00
[52] U.S. Cl. ................................. 17/1 E; 17/25
[58] Field of Search ....................... 17/1 E, 45, 25

[56] References Cited

U.S. PATENT DOCUMENTS

| 3,012,271 | 12/1961 | Morse | 17/1 E |
| 3,314,103 | 4/1967 | Rains | 17/1 E |
| 3,996,644 | 12/1976 | Andersson | 17/1 E |
| 4,031,591 | 6/1977 | Collins | 17/1 E |

Primary Examiner—Willis Little
Attorney, Agent, or Firm—Allegretti & Witcoff, Ltd.

[57] ABSTRACT

Process for stunning animals to be slaughtered by means of an interrupted electrical stunning current surge of low frequency by introducing between stunning and sticking of the animal an intermittent current surge the frequency of which is many times higher e.g. thousand times higher the frequency of the stunning current.

8 Claims, 1 Drawing Sheet

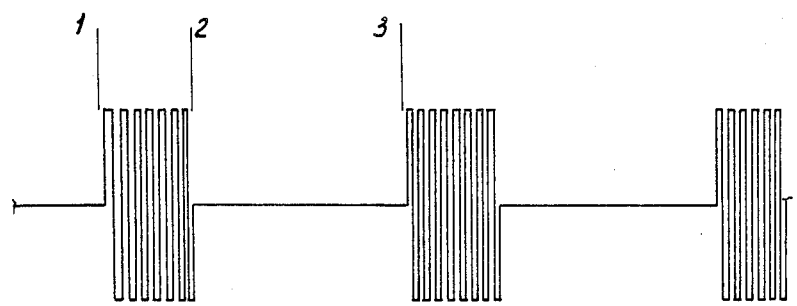

PROCESS FOR STUNNING LIVESTOCK

BACKGROUND OF THE INVENTION

The invention relates to a process for stunning livestock, in particular pigs, by means of an electrical current surge which is transmitted briefly via electrodes to the animal to be stunned, and which can exhibit interruptions and is carried out at low frequency.

Such a process is generally known.

For example, DE-A-21 35 900 discloses the application of a current surge which rises at a speed of 20 to 100 volts per millisecond to a voltage of 600 to 700 volts and has a frequency to 50 to 200 Hz.

It is known from the article entitled "Zum Einfluss der elektrischen Betäubung und des Ausblutens auf die Blutergüsse in Schweinehälften" by P. T. RESETNIKOV that problems arise in the stunning of livestock, through the fact that internal bleeding occurs in a relatively large percentage of the animals to be stunned, as a result of which the meat of these animals is no longer acceptable for consumption and has to be processed as lower-grade meat. In this article it is stated that the stunning takes place with an alternating current of 50 Hz. This article is published in "FLEISCH" 34 (1980) Vol. 4, pp. 70 and 71.

This article refers to a FEOS - U 4 unit which works with high-frequency alternating current. The article discusses research carried out in the USSR.

In the "MITTEILUNGSBLATT" of the Bundesanstalt für Fleischforschung, Kulmbach, "herausgegeben mit finanzieller Unterstützung der Förderergesellschaft der Bundesanstalt für Fleischforschung e.V.", No. 75 of 1 Mar. 1982, a reference is made on p. 4937 to "Betäubungsfalle für Schweine" (stunning trap for pigs), in which an alternating current generator is used with frequencies of 25 Hz or 2000 Hz.

The above-mentioned publications constitute only part of the literature which discusses the problem of electrically stunning livestock and the research carried out to achieve an apparatus with which the stunning current surge no longer produces the disadvantage of internal bleeding.

SUMMARY OF THE INVENTION

The object of the invention is to produce a process with which this purpose is achieved, and this is obtained through the fact that according to the invention, prior to sticking the animal the stunning current surge is followed by an intermittent current surge the frequency of which is a multiple of that of the stunning current surge.

According to the invention, the stunning current surge is thus followed by a second intermittent current surge the frequency of which is many times higher than that of the stunning current surge, being preferably a thousand times or more the frequency of the stunning current surge. This second intermittent high-frequency current surge results in a muscle relaxation and the effect of little or no internal bleeding now occurring can most likely be ascribed to this. The earlier mentioned article by P. T. Resetnikov tells us that the internal bleeding can be assumed to be caused by muscle contractions.

It is stipulated by law that in electrical stunning apparatuses for livestock the voltage must be higher than 240 volts and the current intensity must be higher than 1.27 amperes. The frequency is then generally between 50 and 200 Hz, as already stated. This can be a constant stunning current, i.e. with an uninterrupted vibration of the frequency set, or an intermittent current surge, consisting of a period of, for example, 1 millisecond in which the frequenting current works and an interruption of, for example, 9 milliseconds.

When the intermittent second high-frequency current surge follows this, the muscle relaxation occurs. This current surge can also be described as "relaxation current".

In a stunning current surge with a frequency of 50 to 200 Hz the intermittent current surge or relaxation current has a frequency of preferably at least 100 kHz. This relaxation current surge can also lie in the longwave radio frequency range, preferably in the range between 50 and 100 kHz.

The relaxation current surge must follow as quickly as possible after the stunning current surge, preferably within one second.

It is pointed out that the article "The Use of Electrical Stunning followed by Electro-Immobilization for the humane Slaughter of Cattle" is known from the "New Zealand VETERINARY JOURNAL" of 22 Jan. 1985, and this article deals with calming the stunned animal after the stunning current surge, by means of a pulsating low-voltage current which is applied within 15 seconds for at least 30 seconds at a voltage of 80 volts and a frequency of 15 Hz after the throat is cut for bleeding. This achieves safer working, through calming of the stunned animal, and a certain degree of electrical stimulation to promote the tenderness of the meat, but it does not give the relaxation needed to limit internal bleeding before the throat is cut and after the stunning surge.

It is also pointed out that it is known to work with a pulsating current in the anaesthesia of humans and animals.

From the article "ELEKTROANESTHESIA" by Anthony Sances Jr. and Sanford. J. Larson, published in ACADEMIC PRESS, New York San Francisco London 1975, it is known to work with a frequency of 100 Hz during an anaesthesia period of 10 to 20 minutes. Studies mentioned in this article concerning the wave form of the electrical current used in the anaesthesia go to 10 kHz, but state that power consumption is high at that high value. Lower values seem to be preferable.

From the article "The use of Rectified High Frequency Current in Electrical Anaesthesia" by A. LIMOGE, published in the Proceedings of the First International Symposium, Graz, Austria, 12–17 Sept. 1966, and published as International Congress Series No. 136 by EXCERPTA MEDICA FOUNDATION, it is known to superimpose a high-frequency intermittent current of 100 Hz on a low-frequency current intended for anaesthesia, where the frequency is of the order of magnitude of 100 Hz.

In anaesthesia it is not, however, a matter of treating animals which have to be slaughtered, but of putting humans or animals to sleep in such a way that operations can be performed painlessly. One cannot, therefore, conclude from this that the problem of internal bleeding occurring in slaughter animals when electrical stunning equipment is used can be solved by using an anaesthesia method which gets attention in surgery.

BRIEF DESCRIPTION OF THE DRAWING

The FIGURE is a graphical representation of a frequency/time wave pattern illustrating the instant invention.

DETAILED DESCRIPTION OF THE PREFERRED EMBODIMENT

According to the invention, the high-frequency intermittent current surge has a cycle time of 10 milliseconds, a cycle time which is known per se in anaesthesia. This cycle time can have a current peak of at least one millisecond and an interruption time of no more than 9 milliseconds.

It is preferable to have a peak time of 3 milliseconds and an interruption time of 7 milliseconds.

A stunning current surge is produced for one second with an intermittent current surge which always switches on for 3 milliseconds and switches off for 7 milliseconds at a frequency of 150 Hz, a voltage of 250 volts and an amperage of 1.3.

The relaxation current surge which follows lasts for 3 to 4 seconds, and is also intermittent with 3 milliseconds on and 7 milliseconds off at a frequency of 100 kHz, a voltage of 200 volts and a current intensity of 75 milliamperes.

The relaxation current surge can have a voltage range of, for example, 20 to 200 volts, and an amperage range of 50 to 150 milliamperes at a frequency of 100 kHz with one millisecond peak time and 9 milliseconds interruption time.

The current diagram in the drawing shows between the lines 1 and 2 the peak range of 3 milliseconds, during which time the current surge of 100 kHz always works and the interruption time between the lines 2 and 3.

The relaxation current surge is thus not superimposed on a current of lower frequency, as known in the case of anaesthesia, but follows it.

I claim:

1. In a process for stunning livestock, in particular pigs, comprising administering to the animal to be stunned, through electrodes, a brief low frequency electrical current surge the improvement comprising:
   administering a stunning current surge prior to sticking the animal, followed by an intermittent current surge, the frequency of which is at least a thousand times the frequency of the stunning current surge.

2. The process of claim 1 in which said intermittent current surge follows the stunning current surge within one second.

3. The process of claim 1 in which the stunning current surge has a frequency of about 50 Hz to about 200 Hz and the intermittent current surge has a frequency of about 100 kHz.

4. The process of claim 1 in which the intermittent current surge has a cycle time of 10 milliseconds.

5. The process of claim 4 in which said cycle time has a current peak of at least one millisecond and an interruption time of no more than 9 milliseconds.

6. The process of claim 5 in which said peak time is 3 milliseconds and said interruption time is 7 milliseconds.

7. In a process for stunning livestock prior to sticking the animal which comprises administering to the animal to be stunned through electrodes
   an initial stunning current surge followed by an intermittent alternating current surge having a frequency of between 50 and 100 kHz.

8. In a process for stunning livestock prior to sticking the animal which comprises administering to the animal to be stunned through electrodes
   an initial stunning intermittent current surge of 1.3 amperes at 250 volts and 150 Hz for a period of 1 second, 3 milliseconds on and 7 milliseconds off, followed within one second by
   a relaxation current surge of 50–100 milliamperes, at 20–200 volts and 100 kHz, 1 millisecond on and no more than 9 milliseconds off.

* * * * *